United States Patent
Nakanishi et al.

(10) Patent No.: US 8,051,268 B2
(45) Date of Patent: Nov. 1, 2011

(54) MEMORY CONTROLLER, NONVOLATILE STORAGE DEVICE, NONVOLATILE STORAGE SYSTEM, AND NONVOLATILE MEMORY ADDRESS MANAGEMENT METHOD

(75) Inventors: Masahiro Nakanishi, Kyoto (JP); Tetsushi Kasahara, Osaka (JP); Tomoaki Izumi, Osaka (JP); Kiminori Matsuno, Osaka (JP); Daisuke Kunimune, Osaka (JP); Kazuaki Tamura, Osaka (JP); Yoshiyuki Konishi, Kyoto (JP)

(73) Assignee: Panasonic Corporation, Osaka (JP)

( * ) Notice: Subject to any disclaimer, the term of this patent is extended or adjusted under 35 U.S.C. 154(b) by 469 days.

(21) Appl. No.: 11/814,202

(22) PCT Filed: Jul. 21, 2006

(86) PCT No.: PCT/JP2006/314496
§ 371 (c)(1),
(2), (4) Date: Jul. 18, 2007

(87) PCT Pub. No.: WO2007/013372
PCT Pub. Date: Feb. 1, 2007

(65) Prior Publication Data
US 2009/0055618 A1    Feb. 26, 2009

(30) Foreign Application Priority Data

Jul. 29, 2005  (JP) .................................. 2005-219958
Nov. 16, 2005  (JP) .................................. 2005-331060

(51) Int. Cl.
*G06F 12/00* (2006.01)
(52) U.S. Cl. ................. 711/170; 711/173; 711/E12.084
(58) Field of Classification Search ........................ None
See application file for complete search history.

(56) References Cited

U.S. PATENT DOCUMENTS 5,247,674 A * 9/1993 Kogure ......................... 711/170
(Continued)

FOREIGN PATENT DOCUMENTS

JP    2003 323352    11/2003
(Continued)

OTHER PUBLICATIONS

Yang Jan-Ti., "Performance Comparison of Logical-Address-to-Physical-Address Algorithms for Non-Volatile Memory," ASIC, 2003. Proceedings. 5th International Conference on Oct. 21-24, 2003, Piscataway, NJ, USA, IEEE, vol. 1, Oct. 21, 2003, pp. 482-485, XP010690644, ISBN: 978-0-7803-7889-6.

(Continued)

*Primary Examiner* — Pierre-Michel Bataille
*Assistant Examiner* — Christopher Birkhimer
(74) *Attorney, Agent, or Firm* — Greenblum & Bernstein, P.L.C.

(57) ABSTRACT

For address management of a nonvolatile memory, the whole logical address space is divided into logical address ranges (0 to 15), and the physical address space is divided into physical areas (segments (0 to 15)). The logical address ranges are respectively associated with the physical areas (segments) to manage the addresses. The sizes of the logical address ranges are equalized. The size of the physical area (segment (0)) corresponding to the logical address range (0) in which data of high rewrite frequency such as an FAT is expected to be stored is larger than those of the other physical areas, and the logical address ranges and the physical areas are allocated. Alternatively, the sizes of the physical areas are equalized, and the size of the logical address range (0) is set as a smaller one than those of the other logical address ranges. With this, the actual rewrite frequencies of the physical areas (segments) are equal to one another, and consequently the life of the nonvolatile memory can be prolonged.

7 Claims, 17 Drawing Sheets

U.S. PATENT DOCUMENTS

| | | | |
|---|---|---|---|
| 6,611,907 B1 | 8/2003 | Maeda et al. | |
| 6,671,791 B1 * | 12/2003 | McGrath | 711/206 |
| 6,901,498 B2 | 5/2005 | Conley | |
| 7,039,788 B1 | 5/2006 | Chang et al. | |
| 2004/0083335 A1 | 4/2004 | Gonzalez et al. | |
| 2004/0111553 A1 | 6/2004 | Conley | |
| 2005/0144357 A1 * | 6/2005 | Sinclair | 711/103 |
| 2007/0214309 A1 | 9/2007 | Matsuura et al. | |

FOREIGN PATENT DOCUMENTS

| | | |
|---|---|---|
| JP | 2004 326165 | 11/2004 |
| JP | 2005 107600 | 4/2005 |
| JP | 2006 209608 | 8/2006 |
| WO | 2004 040455 | 5/2004 |
| WO | 2004 040586 | 5/2004 |
| WO | 2004 053888 | 6/2004 |

OTHER PUBLICATIONS

English language Abstract of JP 2005-107600.
English language Abstract of JP 2006-209608.
English language Abstract of JP 2004-326165.
English language Abstract of JP 2003-323352.
U.S. Appl. No. 11/722,362 to Nakanishiu et al., which was filed on Jun. 21, 2007.
U.S. Appl. No. 11/817,532 to Nakanishiu et al., which was filed on Aug. 31, 2007.
U.S. Appl. No. 11/908,715 to Nakanishiu et al., which was filed on Sep. 14, 2007.

* cited by examiner

Fig.3

| PAGE NUMBER | | |
|---|---|---|
| 0 | DATA AREA (5128Byte) | MANAGEMENT AREA (16Byte) |
| 1 | DATA AREA (5128Byte) | MANAGEMENT AREA (16Byte) |
| ⋮ | | |
| 31 | DATA AREA (5128Byte) | MANAGEMENT AREA (16Byte) |

Fig.6

| SEGMENT NUMBER S | PHYSICAL BLOCK START NUMBER PBsn(S) | PHYSICAL BLOCK TOTAL NUMBER PBtn(S) |
|---|---|---|
| 0 | 0 | 4786 |
| 1 | 4786 | 4050 |
| 2 | 8836 | 4050 |
| 3 | 12886 | 4050 |
| 4 | 16936 | 4050 |
| 5 | 20986 | 4050 |
| 6 | 25036 | 4050 |
| 7 | 29086 | 4050 |
| 8 | 33136 | 4050 |
| 9 | 37186 | 4050 |
| 10 | 41236 | 4050 |
| 11 | 45286 | 4050 |
| 12 | 49336 | 4050 |
| 13 | 53386 | 4050 |
| 14 | 57436 | 4050 |
| 15 | 61486 | 4050 |

SEGMENT NUMBER S

| S | LOGICAL BLOCK START NUMBER LBsn(S) | LOGICAL BLOCK TOTAL NUMBER LBtn(S) |
|---|---|---|
| 0 | 0 | 3293 |
| 1 | 3293 | 4013 |
| 2 | 7306 | 4013 |
| 3 | 11319 | 4013 |
| 4 | 15332 | 4013 |
| 5 | 19345 | 4013 |
| 6 | 23358 | 4013 |
| 7 | 27371 | 4013 |
| 8 | 31384 | 4013 |
| 9 | 35397 | 4013 |
| 10 | 39410 | 4013 |
| 11 | 43423 | 4013 |
| 12 | 47436 | 4013 |
| 13 | 51449 | 4013 |
| 14 | 55462 | 4013 |
| 15 | 59475 | 4013 |

207b

MEMORY CONTROLLER, NONVOLATILE STORAGE DEVICE, NONVOLATILE STORAGE SYSTEM, AND NONVOLATILE MEMORY ADDRESS MANAGEMENT METHOD

TECHNICAL FIELD

The present invention relates to a memory controller for controlling a nonvolatile memory such as a flash memory and an address management method for such a nonvolatile memory. The present invention also relates to a nonvolatile storage device and a nonvolatile storage system for writing and reading data to and from such a nonvolatile memory.

BACKGROUND ART

There has been increasingly a demand for nonvolatile storage devices including rewritable nonvolatile memories, mainly for semiconductor memory cards, as external recording devices for use with non-real-time recording apparatuses as represented by personal computers (PCs) and real-time recording apparatuses as represented by digital video cameras. There are various types of semiconductor memory cards, and one type of such semiconductor memory cards are SD (secure digital (trademark)) memory cards.

Such an SD memory card includes a flash memory which is a nonvolatile memory and a memory controller for controlling the flash memory. The memory controller controls reading and writing from and to the flash memory, in response to commands for reading and writing from an access apparatus such as a PC.

Consideration is now made for a case where such an SD card is loaded to an access apparatus such as a PC such that the SD card is regarded as a removable disk with respect to the access apparatus and is managed with a FAT file system for accessing data thereto. With the FAT system, in recording files or data to the recording device, data is read and written usually on a cluster-by-cluster basis, using a file allocation table (FAT).

A flash memory for use as a main storage memory in a semiconductor memory card includes plural physical blocks as units of erasure, each physical block including pages as units of writing. The semiconductor memory card employing such a flash memory has a specific problem of the restriction on the number of times data can be rewritten therein. Although improvement has been made through novel memory techniques, such semiconductor memory cards are not perfect in terms of the reliability for storage of data, in cases of using the semiconductor memory cards as external storage devices. Therefore, there is a need for managing the reliability of data in such a semiconductor memory card, as well as reading and writing of data.

In general, replacement blocks are prepared in a semiconductor memory card, and a bad block which induces read/writ errors is replaced by the replacement block, in order to improve the reliability. Also, in order to prevent concentration of rewriting of data on a certain physical block, an address management method such as wear leveling has been employed. The wear leveling is a so-called logical-to-physical address conversion technique for converting a logical address specified by an access apparatus into a physical address in a flash memory and is generally realized with an address management table.

As one wear leveling method, a dispersion-type address management method has been conventionally employed. The dispersion-type address management method is a method which pre-stores, in management areas of pages as units of writing, logical addresses and status flags of the corresponding blocks and, at the time of initialization, reads the pre-stored information and creates an address management table in a RAM in a memory controller on the basis of the read information.

However, in cases of a nonvolatile storage device having a large-capacity memory space, the aforementioned wear leveling method requires an extremely long time period for reading the management areas in the entire memory space, at the time of initialization. This may violate specifications, for example, in such a way as to cause initialization time to exceed upper limit in the specification of initialization time of the nonvolatile storage device to be exceeded. Also, even in cases of a nonvolatile storage device having no particular specifications, the aforementioned wear leveling method causes the demerit of the increase of the waiting time until the nonvolatile storage device becomes accessible, even through this does not violate specifications. Furthermore, the RAM which temporarily stores the address management table is required to have an extremely large capacity, thereby causing a problem in the cost.

In order to overcome the aforementioned problem, storage devices as described in Patent Document 1, (i.e, JP-A-2003-323352) employ a combination of two techniques which are (1) a segment management method and (2) a concentration-type address management method.

The segment management method is a method which divides an entire logical address space to be managed by an access apparatus into plural logical address ranges (regions) and manages the plural logical address ranges in association with plural physical areas (segments) in a flash memory which are created by physically dividing the flash memory.

On the other hand, the concentration-type address management method is a method which pre-stores an address management table itself in a flash memory, reads the address management table in a RAM in response to each data writing command from an access apparatus and updates the address management table in the RAM and rewrites it to the flash memory after the completion of the writing of data.

Patent Document 1: JP-A-2003-323352

DISCLOSURE OF INVENTION

Problems to be Solved by the Invention

In a conventional nonvolatile storage device, as illustrated in FIG. 17, the physical space is divided into segments (physical areas) having the same size. Since the respective segments in the physical space has the same size, data can be rewritten to the respective segments the same number of times. On the other hand, the logical space is also divided into equal sizes.

A file allocation table (FAT) is rewritten with a higher frequency than that of other data. Further, such a file allocation table is written to the head area of the address ranges (for example, a logical address range 0 in FIG. 17).

In cases where there is data which is rewritten with a higher frequency, such as a FAT, the logical address range (the logical address range 0) including such data is accessed with a higher frequency than that of the other logical address ranges (the logical address ranges 1 to 15). Therefore, the segment (the segment 0) corresponding to the address range 0 reaches a rewritable life earlier than the other segments (the segments 1 to 15), which causes the problem that the nonvolatile storage device becomes unusable when the segment 0 reaches its life, even through there still exist usable storage areas.

The present invention has been made in view of the aforementioned conventional problem and aims at providing techniques for realizing a nonvolatile storage device capable of increasing its life.

Solving Means

A memory controller according to the present invention is a controller which writes and reads data to and from a nonvolatile memory according to a command provided from an external access apparatus and a logical address. The memory controller includes a read/write controller that controls reading and writing of data from and to the nonvolatile memory, and an address management section that divides an entire logical address space into plural logical address ranges, performs address management for individual logical address ranges, divides, physically, the storage area of the nonvolatile memory into plural physical areas, and manages the logical address ranges and the physical areas while associating the logical address range with the physical area. The address management section includes an area allocation section that determines allocation of the logical address ranges and the physical areas so that a ratio of logical address range size to the physical area size for at least one logical address range is different from that for the other logical address ranges.

The area allocation section may allocate the logical address ranges such that the sizes of the respective logical address ranges are same, and allocate the physical areas such that the size of at least one physical area is different from the size of the other physical areas. In this case, the size of the physical area corresponding to a logical address range which stores data to be rewritten with a higher frequency may be set to be larger than the size of the other physical areas.

Alternatively, the area allocation section may allocate the physical areas such that the sizes of the respective physical areas are same, and allocate the logical address ranges such that the size of at least one logical address range is different from the size of the other logical address ranges. In this case, the size of a logical address range which stores data to be rewritten with a higher frequency may be set to be smaller than the size of the other logical address ranges.

The data to be rewritten with a higher frequency may be management information used for managing files, such as a file allocation table (FAT).

A nonvolatile storage device according to the invention includes a nonvolatile memory, and the above memory controller that writes and reads data to and from the nonvolatile memory.

A nonvolatile storage system according to the invention includes the above nonvolatile storage device, and an access apparatus that accesses the nonvolatile storage device by specifying a logical address therein.

An address management method according to the invention is provided for a nonvolatile memory including plural physical blocks and being adapted to allow data to be written and read thereto and therefrom according to a command provided from an access apparatus and a logical address. The method includes the steps of dividing an entire logical address space into plural logical address ranges and performing address management for the individual logical address ranges; dividing, physically, the storage area of the nonvolatile memory into plural physical areas and managing the logical address ranges and the physical areas while associating the logical address range with the physical area; and determining the allocation of the logical address ranges and physical areas so that a ratio of logical address range size to the physical area size for at least one logical address range is different from that for the other logical ranges.

Effects of the Invention

According to the present invention, allocation of logical address ranges and segments is made such that a ratio of logical address range size to segment size with respect to a logical address range which has higher rewriting frequency is made different from ratios with respect to the other logical address ranges. This can equalize the rewriting frequency for each segment, thereby extending the life of the nonvolatile storage device.

BRIEF DESCRIPTION OF DRAWINGS

FIG. 3 is a view illustrating a physical block in a nonvolatile memory in a nonvolatile storage device according to the present invention.

FIG. 6 is a view illustrating a memory map of an area allocation table in the nonvolatile storage device, according to the first embodiment of the present invention.

FIG. 14 is a view illustrating a memory map of an area allocation table in the nonvolatile storage device, according to the second embodiment of the present invention.

REFERENCE SIGNS

Figure 1:
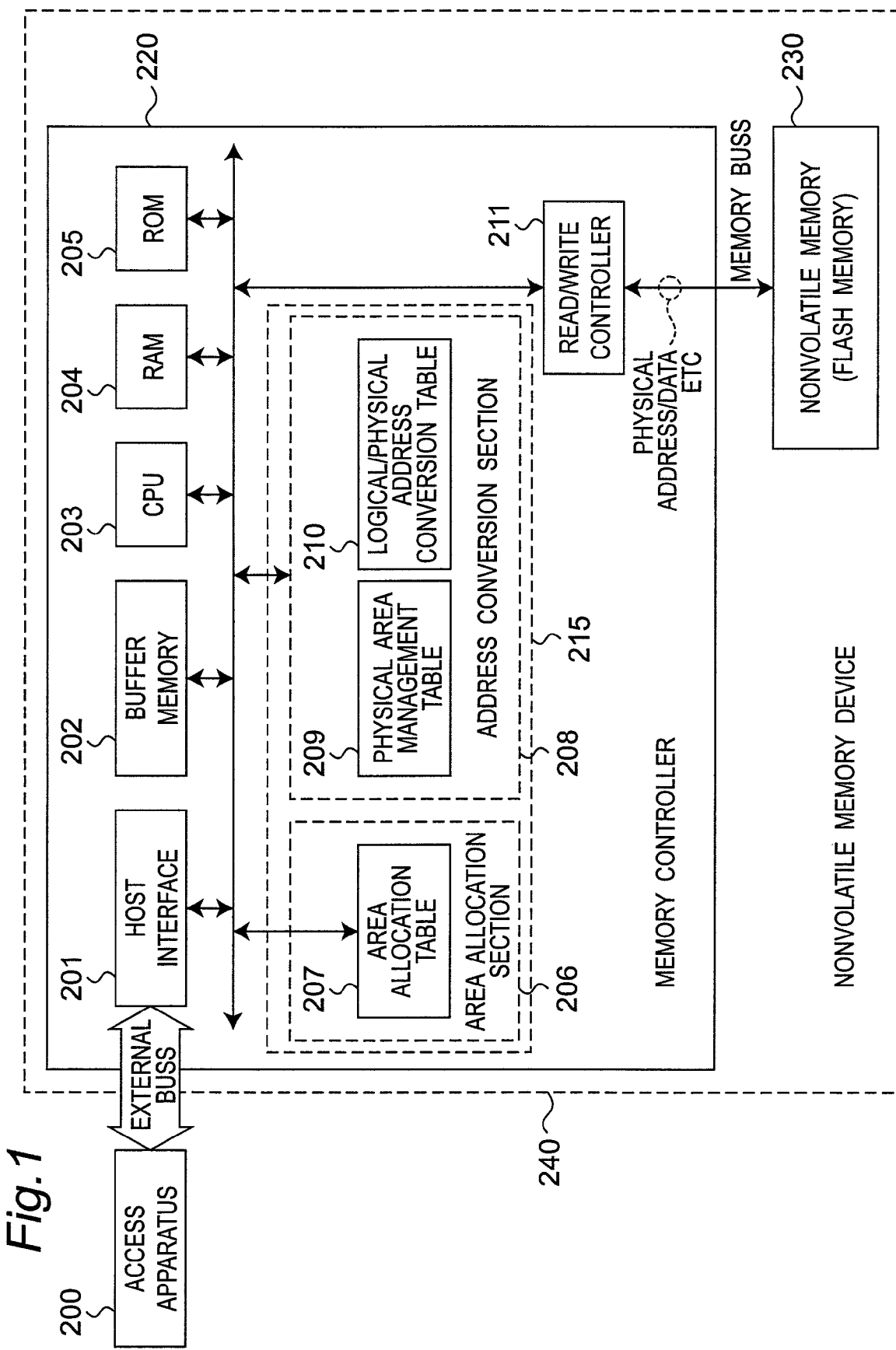
FIG. 1 is a block diagram illustrating the configuration of an entire nonvolatile storage system according to a first embodiment of the present invention.

200 Access apparatus
201 host interface
202 buffer memory
203 CPU
204 RAM
205 ROM
206, 206b area allocation section
207, 207b area allocation table
208, 208b address conversion section
209, 209b physical area management table
210, 210b logical/physical address conversion table
211 read/write controller
215, 215b address management section
220 memory controller
230 nonvolatile memory
240, 240b nonvolatile storage system

BEST MODE FOR CARRYING OUT THE INVENTION

Hereinafter, nonvolatile storage systems according to embodiments of the present invention will be described, with reference to the accompanying drawings.

First Embodiment 1.1 System Configuration

FIG. 1 is a view illustrating the configuration of a nonvolatile storage system according to a first embodiment of the present invention. The nonvolatile storage system includes an access apparatus 200 and a nonvolatile storage device 240 to and from which data is written and read by the access apparatus 200.

The nonvolatile storage device 240 stores data therein according to a data writing command from the access apparatus 200 and reads, therefrom, data stored therein according to a data reading command from the access apparatus 200. The nonvolatile storage device 240 includes a memory controller 220 and a nonvolatile memory 230. The memory controller 220 includes a host interface 201, a buffer memory 202, a CPU 203, a RAM 204, a ROM 205, an area allocation section 206, an address conversion section 208, and a read/write controller 211. The area allocation section 206 and the address conversion section 208 constitute an address management section 215.

The area allocation section 206 includes an area allocation table 207, and the address conversion section 208 includes a physical area management table 209 and a logical/physical address conversion table 210.

The area allocation section 206 associates logical address ranges in a logical address space with segments in a physical address space. Hereinafter, the logic address ranges and the segments will be described.

Figure 2:
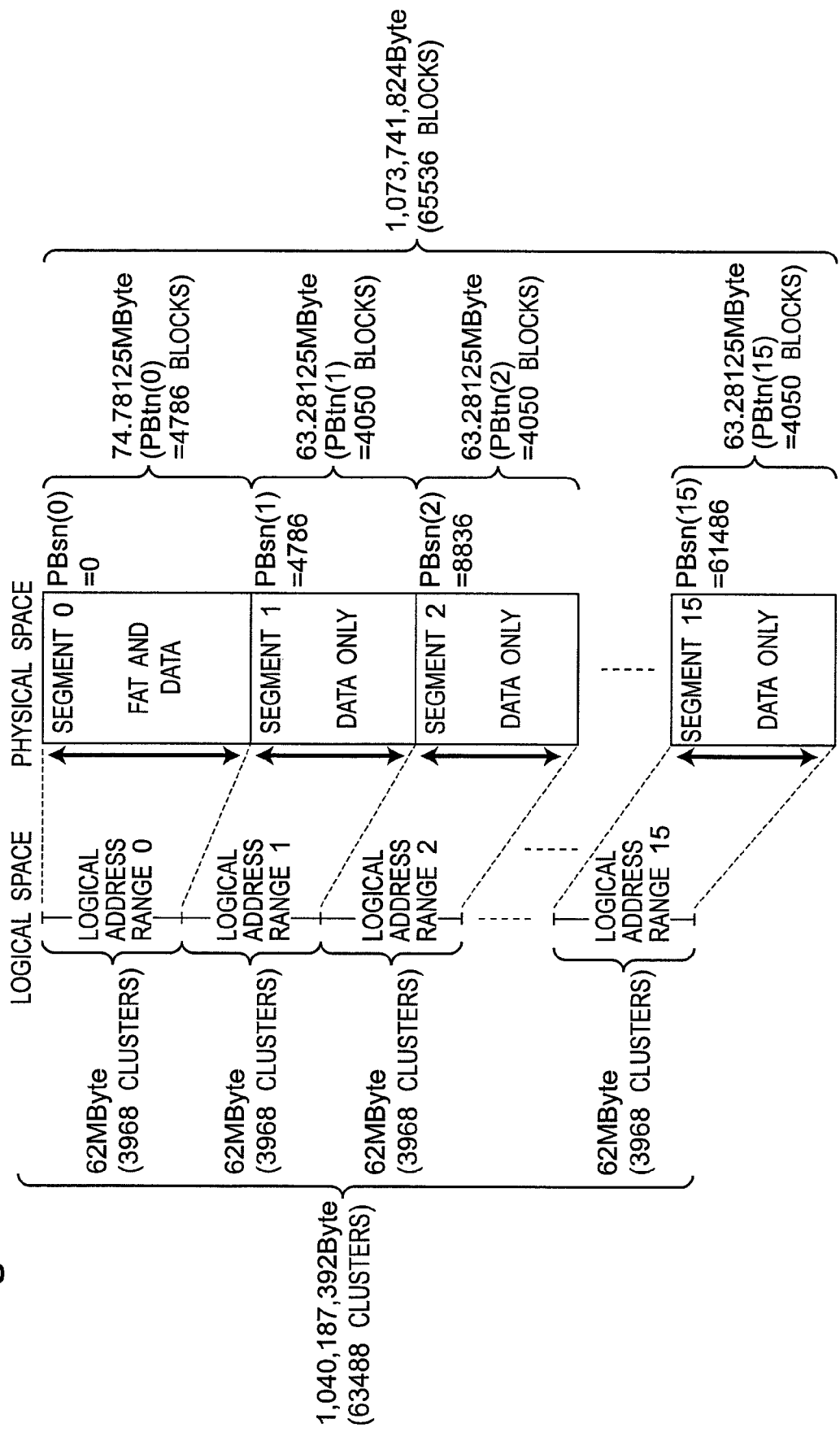
FIG. 2 is a view illustrating a memory map illustrating the correspondence between a logical address space and a physical address space according to the first embodiment of the present invention.

FIG. 2 shows a memory map designating the correspondence between the logical address space and the physical address space, according to the present embodiment. The logical address space is a space of addresses which are specified by the access apparatus 200 in writing and reading data, and the physical address space is a space of physical address of the nonvolatile memory 230 such as a flash memory. In the present embodiment, the logical address space is divided into 16 ranges which are logical address ranges 1 to 15, while the physical address space is divided into 16 segments which are segments 0 to 15. Each segment includes plural physical blocks, and each single physical block has a size of 16 kBytes. In the same figure, PBtn(S) indicates the total number of physical blocks included in the segment S. PBsn(S) indicates the start number of the physical blocks in the segment S. S is an integer in the range of 0 to 15. The area allocation section 206 associates the physical address ranges illustrated in FIG. 2 with the segments.

Returning to FIG. 1, the address conversion section 208 determines an address such as a data writing destination address (to which data is written) on the basis of area allocation processing by the area allocation section 206. The read/write controller 211 writes and reads data in and from the physical address specified by the address conversion section 208.

The area allocation table 207 can either be stored in a nonvolatile RAM (not illustrated) incorporated in the area allocation section 206 or can be stored in the nonvolatile memory 230 and can be read in the nonvolatile RAM at the time of initialization of the nonvolatile storage device 240. The present embodiment is based on the premise that the area allocation table 207 is stored in the nonvolatile RAM, for ease of description.

A set of a physical area management table 209 and a logical/physical address conversion table 210 is stored in each segment in the nonvolatile memory 230, and a single set of a physical area management table 209 and a logical/physical address conversion table 210 is provided for managing the addresses within the range of the corresponding single segment. Hereinafter, all sets of a physical area management table 209 and a logical/physical address conversion table 210 will be comprehensively referred to as "address management tables".

The nonvolatile memory 230 has a storage capacity of 1 GBytes (1,073,741,824 Bytes). The address space viewed from the access apparatus 200, namely the logical address space, has a storage capacity of 1,040,187,392 Bytes, as illustrated in FIG. 2.

FIG. 3 is a view illustrating the configuration of a physical block in the nonvolatile memory 230. A single physical block includes 32 pages, each page being constituted by a data area of 512 Bytes and a management area of 16 Bytes. Data of 16 kbytes (512 Bytes×32 pages) can be stored in a single physical block. In case of writing a single cluster (corresponding to a single logical block), data is written to the areas of the pages 0 to 31 in a single physical block, in order. In the management area of the page 0, dispersion management information about the physical block is stored. The dispersion management information includes the logical block number specified by the access apparatus 200 and the block status indicating the status of the physical block. At the time of initialization of the nonvolatile memory 240, the dispersion management information is read from the respective physical blocks included in the area of the nonvolatile memory 230 which corresponds to the segment number S and, then, an address management table for the segment S is created and stored in the region of the segment S.

Figure 4:
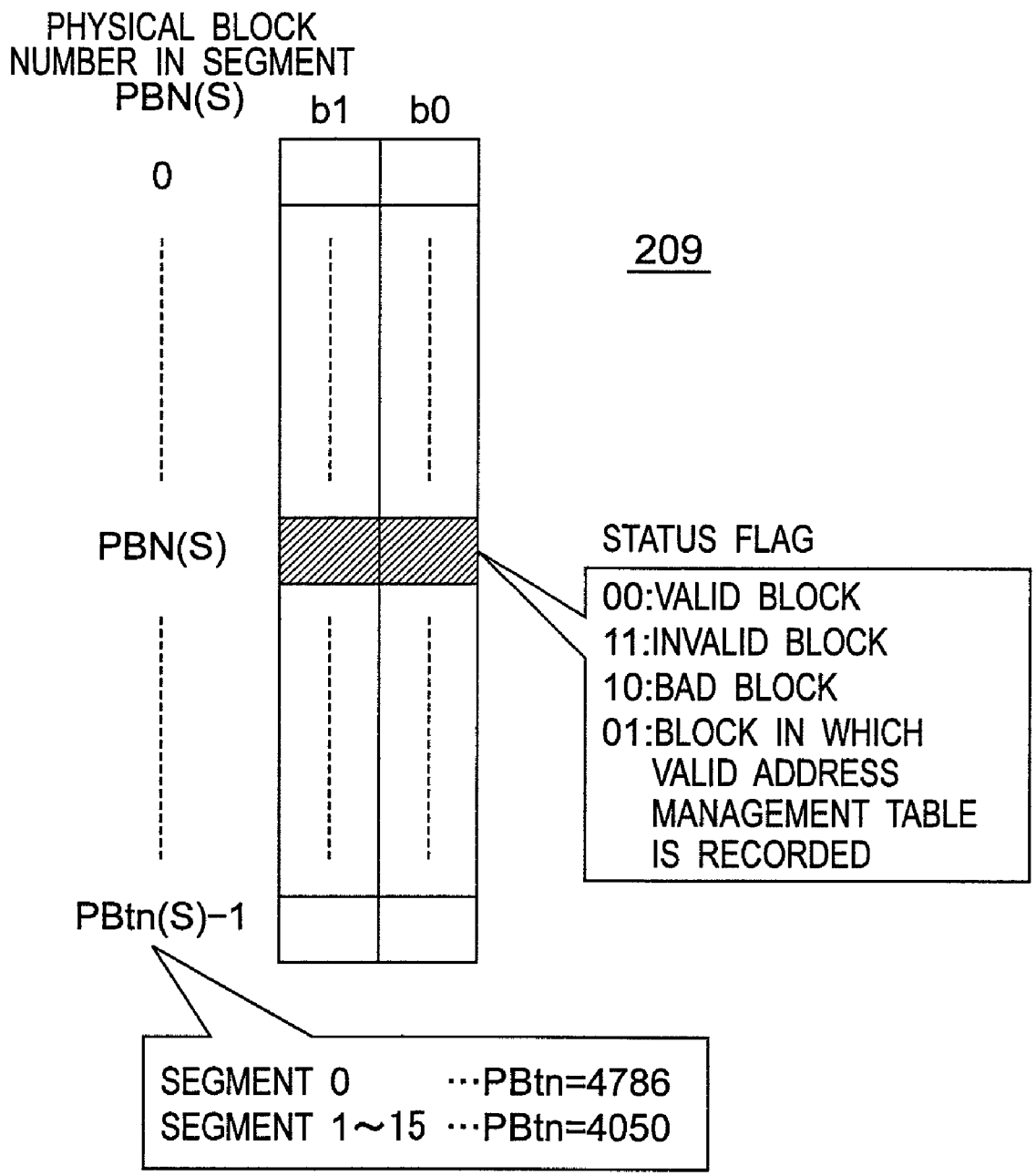
FIG. 4 is a view illustrating a physical area management table in the nonvolatile storage device, according to the first embodiment of the present invention.

FIG. 4 is a view illustrating the physical area management table 209. In FIG. 4, the addresses of the respective entries of the physical area management table 209 correspond to the physical block numbers PBN(S) in the segments S in the nonvolatile memory 230. The physical area management table 209 stores, for each physical block, "valid", "invalid", "bad" and the like, as information about the statuses thereof (block statuses). More specifically, a binary value of "00" indicates a valid block which is a block in which valid data has been already written. A binary value of "11" indicates an invalid block from which data has been erased or in which data has been already written but the data is unnecessary. A binary value of "10" indicates a bad block, which is a block unusable due to solid errors and the like in memory cells. A binary value of "01" indicates that the physical block stores an address management table. As described above, there are at least four states.

Figure 5:
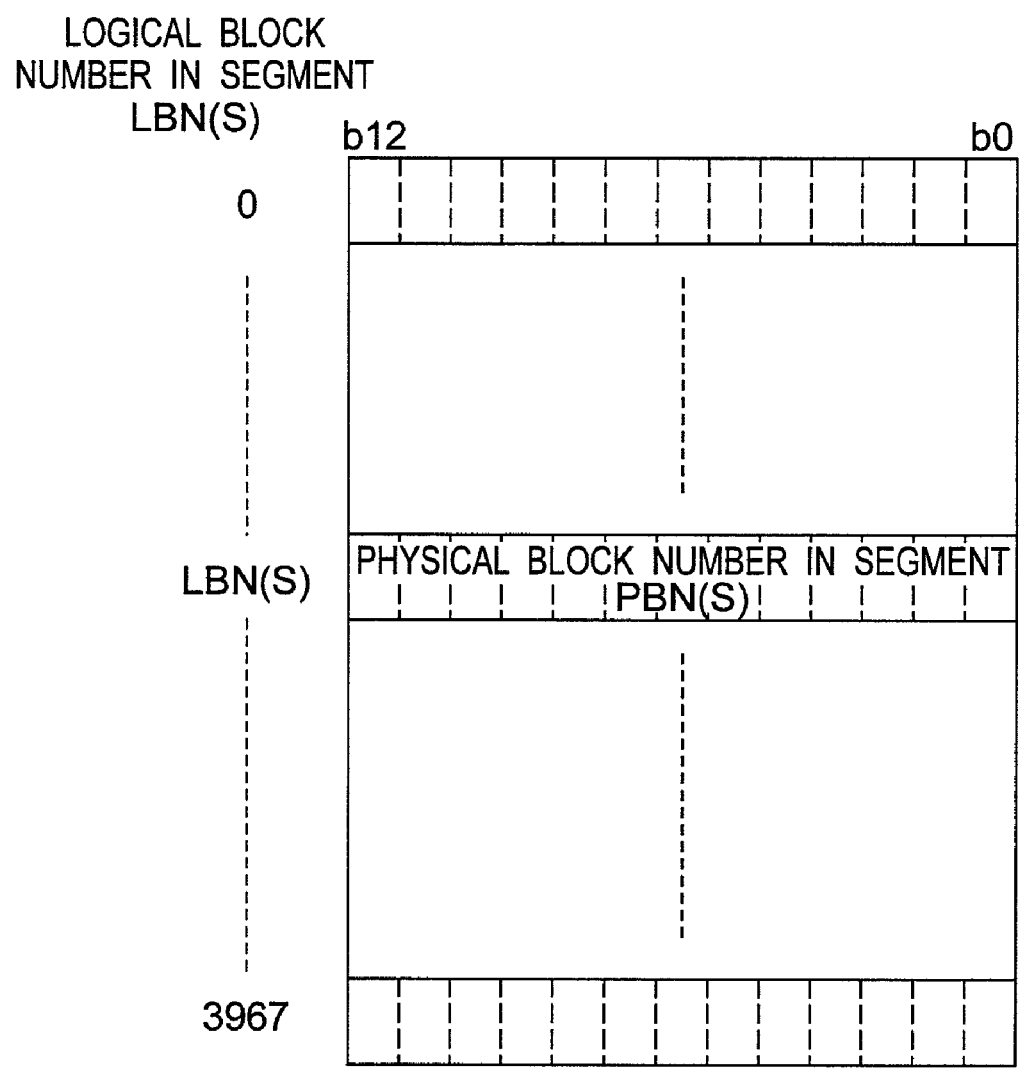
FIG. 5 is a view illustrating a logical/physical address conversion table in the nonvolatile storage device, according to the first embodiment of the present invention.

FIG. 5 is a view illustrating the logical/physical address conversion table 210. In FIG. 5, the addresses of the respective entries of the logical/physical address conversion table 210 correspond to the logical block numbers LBN(S) in the segment S. In the areas of the addresses, there are stored the physical block numbers PBN(S) corresponding to the logical block numbers LBN(S).

FIG. 6 shows a memory map of the area allocation table 207. The addresses of the respective entries of the area allocation table 207 correspond to the segment numbers S and, in the areas of the addresses, there are stored the physical-block start numbers PBsn(S) of the respective corresponding segments S and the total numbers PBtn(S) of the physical blocks in the corresponding respective segments S. Namely, the area allocation table 207 includes a portion storing the start numbers PBsn(S) of the physical blocks and a portion storing the total numbers PBtn(S) of the physical blocks. The former corresponds to the start addresses of the respective segments, and the latter indicates the total numbers of the physical blocks constituting the respective segments.

Figure 7:
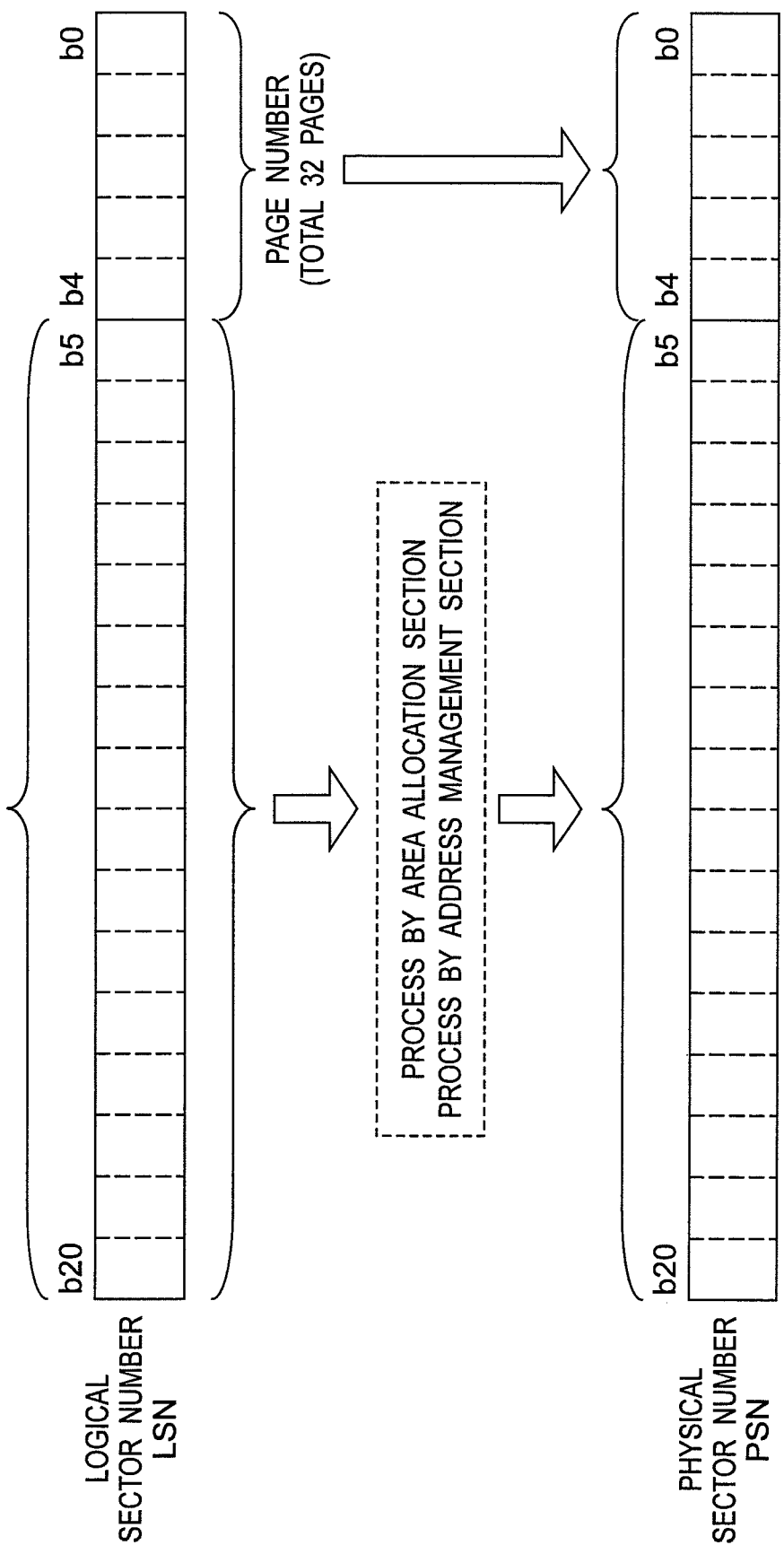
FIG. 7 is a view illustrating an address format illustrating the correspondence between a logical sector number LSN (a logical sector address) and a physical sector number PSN (a physical sector address) of the nonvolatile storage device, according to the first embodiment of the present invention.

FIG. 7 shows an address format indicating the correspondence between a logical sector number LSN (a logical sector address) and a physical sector number PSN (a physical sector address). The bits 0 to 4 (LSN [4:0]) of the logical sector number LSN correspond to a page number (PSN [4:0]) in a physical block. The bits 20 to 5 of the logical sector number LSN correspond to a logical block number LBN. The logical block number LBN corresponds to a cluster number. The area allocation section 206 conducts area allocation processing illustrated in FIG. 6, on the basis of the logical block number LBN.

1.2 Operations

Hereinafter, there will be described operations of the nonvolatile storage device 240 having the aforementioned configuration.

1.2.1 Basic Operations

At the time of first use of the nonvolatile storage device 240 after the shipment, all non-bad blocks in the nonvolatile memory 230 are all at an erased state. However, in each segment, there is stored address management tables each of which are provided for managing the addresses in each segment, in the single physical block at the final address in each segment. At this time, in the physical region management table 209, a status flag is set to "01" for the physical block storing the address management table including the physical area management table 209, namely the physical block at the final address, and a set status flag is set to "10" for bad physical blocks. Although there actually exists a system area storing system information, it is not directly related to the concept of the present invention and is not described herein.

After the nonvolatile storage device 240 is powered on, the CPU 203 conducts initialization processing on the basis of programs stored in the ROM 205 and enters a state where it waits for a command for reading, writing and the like from the access apparatus 200.

Thereafter, the access apparatus 200 generates a command for writing to a desired logical address range. So-called content data such as image data (hereinafter, simply referred to as "data") can be written to all the logical address ranges, while a FAT can be written to only the logical address range 0. Every time data or a FAT is written, the address management table stored in the segment in the nonvolatile memory 230 corresponding to the writing-destination logical address range is read from the single physical block at the final address in this segment. On the basis of the read address management table, a physical area management table 209 and a logical/physical address conversion table 210 are generated and, then, are stored in the RAM in the address conversion section 208.

In writing data or a FAT, a writing-destination physical block is determined on the basis of the physical area management table 209 and the logical/physical address conversion table 210, and the data or FAT is written to the physical block. After the data or a FAT is written thereto, the address conversion section 208 updates the physical area management table 209 and the logical/physical address conversion table 210 in the RAM and rewrites them in the nonvolatile memory 230. Since the physical block which stores the address management table is also to be subjected to wear leveling, the physical block to which the address management table is rewritten is changed every time data or a FAT is written, as will be described later.

In this case, writing is conducted on the basis of the following precondition, for ease of description.

<Preconditions for Writing>

(1) The nonvolatile storage device has a writing rate of 2 MB/second.

(2) A FAT is written once during writing of data for 1 second.

(3) Data corresponding to a single cluster (16 kbytes) is written for a single write command.

(4) A FAT is duplexed in a FAT1 and a FAT2, each having a capacity of 16 kbytes, and, therefore, a FAT has a total capacity of 32 KBytes. A FAT corresponding to 32 KBytes is written for a single command for writing.

(5) A physical block has a size of 16 kBytes (see FIG. 3).

(6) The rate of occurrence of bad blocks in the nonvolatile memory 230 is 2%, and the rate of occurrence of bad blocks in each segment is also 2%.

(7) A physical region management table 209 (about 1 kBytes) and a logical/physical address conversion table 210 (about 8 kBytes) are stored together in a single physical block in the associated segment. These tables stored together are referred to as "an address management table".

(8) A single address management table is stored in a single physical block in each segment in the nonvolatile memory 230. For each access by the access apparatus 200, the address management table is read in the RAM in the address conversion section 208 and, then, the physical area management table 209 and the logical/physical address conversion table 210 are created. After data or a FAT is written, the physical area management table 209 and the logical/physical address conversion table 210 are updated in the RAM and, then, they are rewritten as an updated address management table in a physical block different from the aforementioned physical block.

1.2.2 Consideration of Rewriting Frequency

Consideration will be conducted on the frequencies of rewriting to each segment in the nonvolatile storage device according to the first embodiment of the present invention, in cases of writing according to the aforementioned preconditions, in comparison with a conventional nonvolatile storage device.

<Conventional Nonvolatile Storage Device>

As illustrated in FIG. 19, a conventional nonvolatile storage device includes segments having the same size and, therefore, in cases where data is rewritten to the entire logical space, namely the area of about 1 GBytes, the frequency of rewriting of data to the segment 0 which stores a FAT, is higher than those of the other segments.

More specifically, first of all, if all the data stored in the entire logical space, namely the area of about 1 GBytes, is rewritten, the number of physical blocks in each segment to which data is rewritten is 3968, which is equal to the number of clusters constituting the corresponding logical address range. The time period required for the rewriting is 512 seconds, on the basis of the preconditions (1) and an equation (1).

$$1\ [\text{GBytes}]/2\ [\text{MB/second}]=512\ [\text{seconds}] \quad (1)$$

On the basis of the preconditions (2), (4) and (5), a FAT (32 kBytes) is rewritten 512 times during 512 seconds. Since a FAT is assigned to only the segment 0, during this rewriting of the FAT, the number of physical blocks in the segment 0 to which a FAT is rewritten is 1024, on the basis of an equation (2).

$$(32\ [\text{kBytes}]/16\ [\text{kBytes}])\times 512\ [\text{times}]=1024 \quad (2)$$

Since the segments 1 to 15 include only data, the frequency of rewriting of data to each physical block is 0.97 time on the basis of an equation (3).

$$3968/4096 \approx 0.97\ \text{time} \quad (3)$$

On the other hand, since the segment 0 includes both data and a FAT, the frequency of rewriting of data or a FAT to each physical block in the segment 0 is 1.22 times, on the basis of an equation (4). In this case, "−2" in the left-hand side of the equation (4) corresponds to subtraction of 2 clusters for FAT 1 and FAT 2.

$$(3968-2+1024)/4096 \approx 1.22\ \text{time} \quad (4)$$

It has been proven, from the equations (3) and (4), that the rewriting frequency to the segment 0 is higher than those to the other segments, which causes the segment 0 to reach, relatively earlier, a guaranteed number of rewritings (for example, 100,000 times). This means that the life of such a conventional nonvolatile storage device is equal to the pace at which the segment 0 reaches the guaranteed number of rewritings.

<Nonvolatile Storage Device According to the First Embodiment of the Present Invention>

In the nonvolatile storage device 240 according to the first embodiment of the present invention, the area allocation is adjusted such that the segment 0 having a higher rewriting frequency includes a greater number of physical blocks than those of the other segments, in order to average the paces at which the respective segments reach a guaranteed number of rewritings to extend the life.

Namely, in the nonvolatile storage device 240 according to the present embodiment, as illustrated in FIG. 2, the segment 0 having a higher rewriting frequency has a size greater than the sizes of the other segments 1 to 15. The calculation of the segment sizes is varied depending on the rate of occurrence of bad blocks in the nonvolatile memory 230, the architecture of the memory controller and the like. In the present embodiment, respective logical address ranges are determined as follows. The basic concept for the determination is based on setting the sizes of the segments 1 to 15 other than the segment 0 to be as small as possible, in order to ensure a largest possible size of the segment 0.

More specifically, at first, the number of physical blocks in each of the segments 1 to 15 is determined, on the basis of an equation (5). In the equation (5), a factor of 0.02 is a factor corresponding to the rate of occurrence of bad blocks in the nonvolatile memory 230 (for example, 2%), and "1" in the left-hand side corresponds to a single physical block which stores an address management table.

$$\{(3968+1)/(1-0.02)\}=4050 \quad (5)$$

Namely, the size of each segment 1 to 15 is set to be a necessary minimum size, in consideration of the rate of occurrence of bad blocks.

Next, the number of physical blocks in the segment 0 is determined on the basis of an equation (6).

$$65536-(4050\times 15\ \text{segments})=4786 \quad (6)$$

In this case, "65536" is the total number of physical blocks in the nonvolatile memory 230. In the present embodiment, areas which are not directly related to the invention, such as system areas, have not been considered, for ease of description.

Accordingly, the rewriting frequency of data to each physical block in the segments 1 to 15 is 0.98, on the basis of the following equation.

$$3968/4050 \cdot 0.98\ \text{time} \quad (7)$$

The frequency of rewriting data to each physical block in the segment 0 is 1.04 on the basis of the following equation.

$$(3968-2+1024)/4786 \approx 1.04\ \text{time} \quad (8)$$

The results of the aforementioned calculations reveal that, according to the present embodiment, the rewriting frequency of the segment 0 can be significantly reduced in comparison with the prior art and, also, the difference in the rewriting frequency between the segment 0 and the other segments 1 to 15 is reduced in comparison with the prior art. Accordingly, in the present embodiment, it is possible to equalize the rewriting frequencies, thereby increasing the life of the nonvolatile memory 230.

The physical boundaries of the respective segments are determined from the equations (5) and (6), and information thereabout is stored in a nonvolatile RAM in the area allocation section 206, as an area allocation table 207 as illustrated in FIG. 6. The area allocation table 207 can be stored in any of the physical blocks in the nonvolatile memory 230 and, at the time of initialization, it can be read therefrom to the RAM. The RAM can be provided in the area allocation section 206 or can be a partial area of the RAM 204.

1.2.3 Processing by the Address Management Section

Hereinafter, there will be described processing by the address management section 215 (the area allocation section 206 and the address conversion section 208), in a case where the access apparatus 200 generates a command for rewriting one cluster of data.

Figure 8:
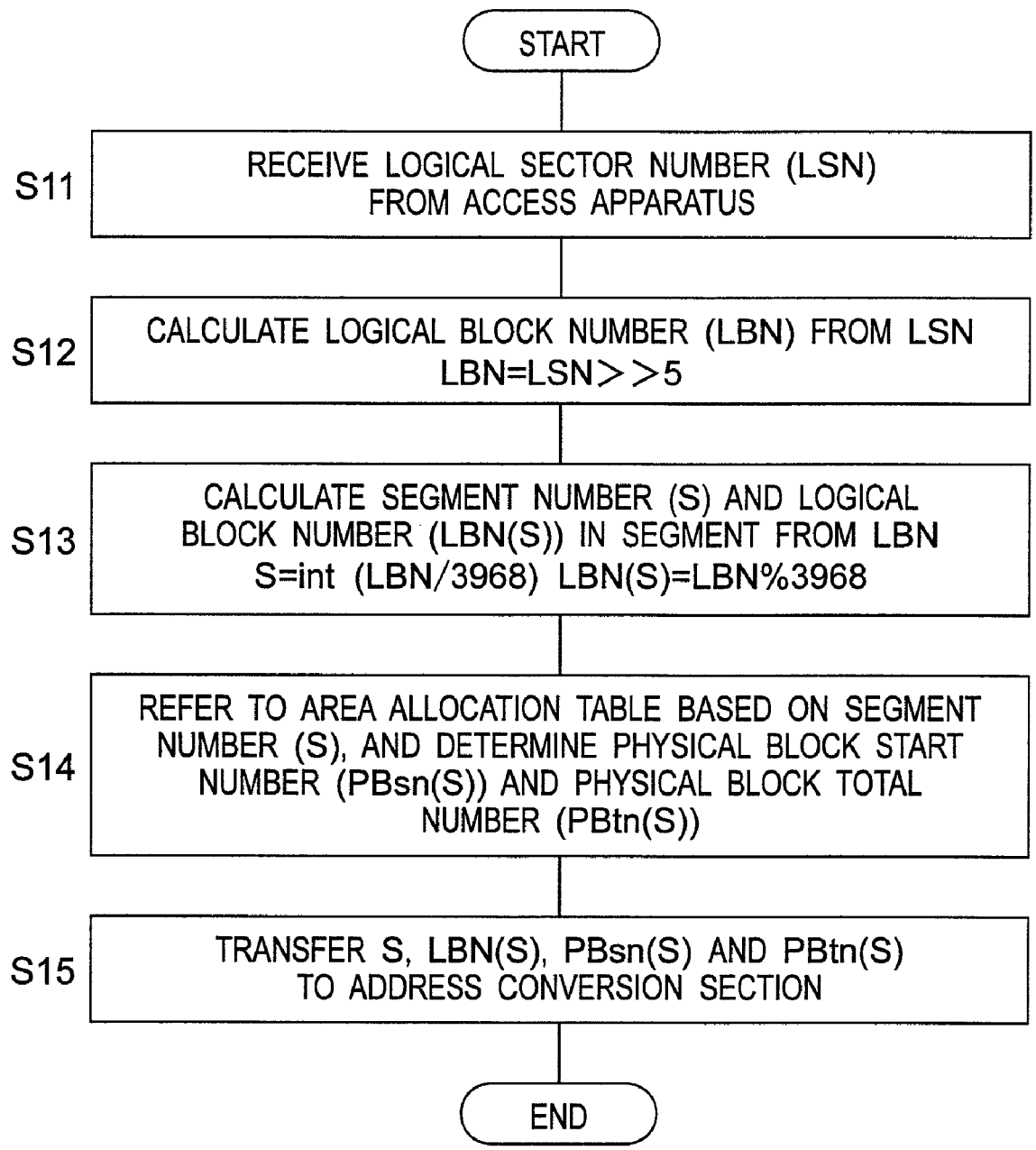
FIG. 8 is a flow chart illustrating processing by an area allocation section in the nonvolatile storage device, according to the first embodiment of the present invention.

If the memory controller 220 receives a write command from the access apparatus 200, the CPU 203 transfers the control to the address management section 215. The area allocation section 206 in the address management section 215 determines the segment S and the logical block number LBN (S) in the segment which correspond to the logical address specified by the access apparatus 200 with reference to the area allocation table 207. More specifically, the area allocation section 206 conducts processing according to a flow chart illustrated in FIG. 8.

First, the area allocation section 206 receives a logical sector number LSN from the access apparatus 200 (S11) and calculates a logical block number LBN according to an equation (9) on the basis of the received logical sector number LSN (S12). In the equation (7), ">>" is an operator indicating a rightward shift. The rightward shift of the logical sector number LSN by 5 bits allows the logical block number LBN to be determined, according to the bit format illustrated in FIG. 7.

$$LBN=LSN>>5 \qquad (9)$$

Next, on the basis of equations (10) and (11), the segment number S and the logical block number LBN(S) in the segment are calculated from the logical block number LBN (S13). In an equation (10), "into" is an operator for determining an integer. Further, in the equation (11), "%" is an operator for determining the reminder.

$$S=\text{int}(LBN/3968) \qquad (10)$$

$$LBN(S)=LBN\,\%\,3968 \qquad (11)$$

By referring to the area allocation table 207 on the basis of the segment number S determined from the equation (10), the physical-block start number PBsn(S) and the physical-block total number PBtn(S) of the corresponding segment are determined (S14). Finally, the segment number S, the logical block number LBN(S) in the segment, the physical-block start number PBsn(S) and the physical-block total number PBtn(S) are transferred to the address conversion section 208 (S15) and, thus, the processing ends.

Figure 9:
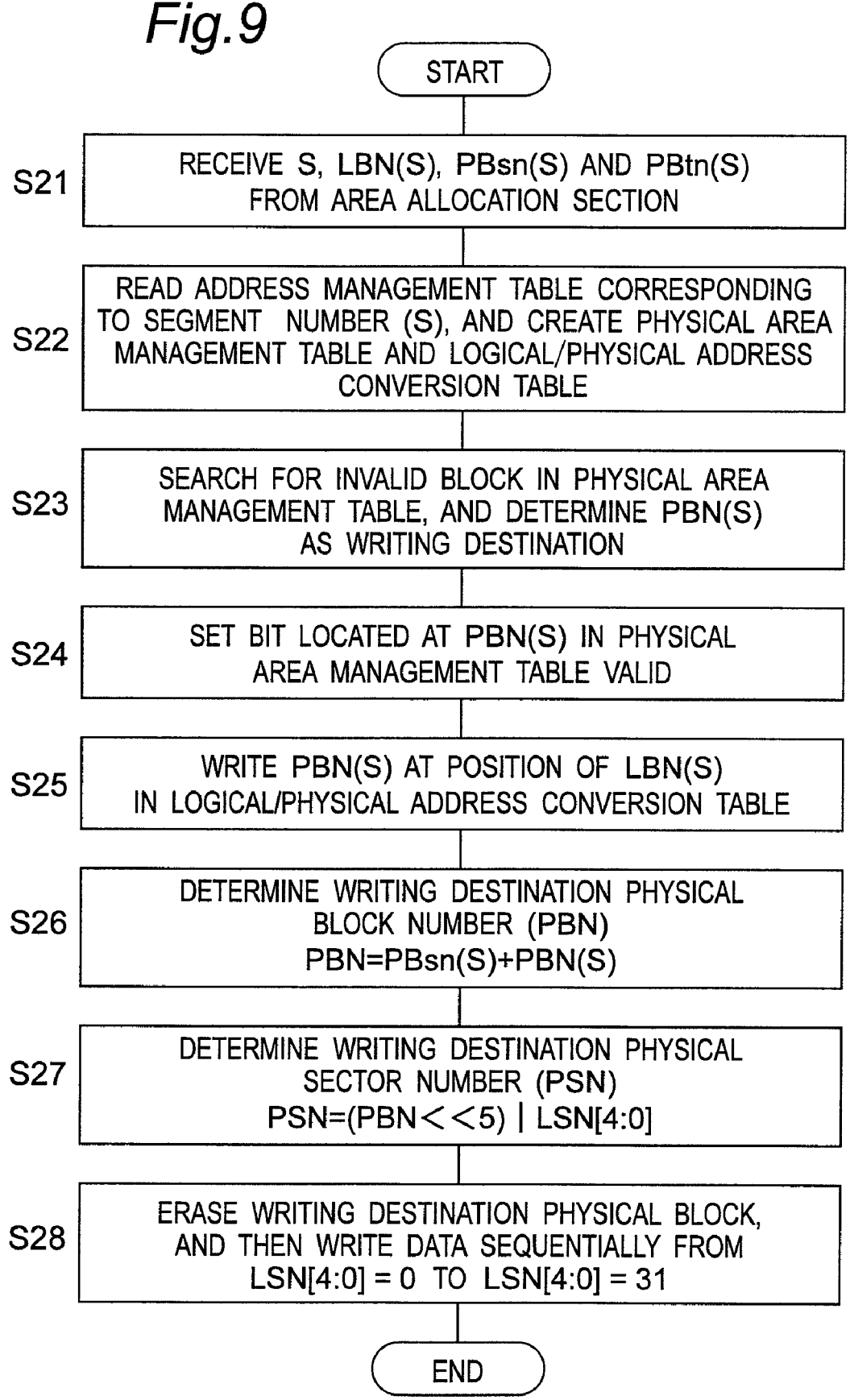
FIG. 9 is a flow chart illustrating processing by an address conversion section in the nonvolatile storage device, according to the first embodiment of the present invention.

Thereafter, the address conversion section 208 determines the physical address to which data is to be rewritten, according to a flow chart illustrated in FIG. 9.

First, the address conversion section 208 receives, from the area allocation section 206, the segment number S, the logical block number LBN(S) in the segment, the physical-block start number PBsn(S) and the physical-block total number PBtn(S) (S21). The address conversion section 208 reads an address management table from the area of the nonvolatile memory 230 which corresponds to the segment number S and creates a physical area management table 209 and a logical/physical address conversion table 210, from the read address management table (S22).

The address conversion section 208 searches for invalid blocks in the physical area management table 209 and determines a PBN(S) as a writing destination (S23). In this case, the searching range is from 0 to PBtn(S)−1.

Then, the bit at the position of the PBN(S) in the physical area management table 209 is changed to "valid" (S24), and "PBN(S)" is written to the position of LBN(S) in the logical/physical address conversion table 210 (S25).

Thereafter, in writing data to the nonvolatile memory 230, the writing-destination physical block number PBN is determined on the basis of an equation (12) (S26). Then, the physical address based on the sector, namely the physical sector number PSN, is determined on the basis of an equation (13) (S27). In the equation (13), "|" is an operator indicating a logical sum, and "LSN[4:0]" indicates bit sequence of bits 0 to 4 in the logical sector number LSN in FIG. 7.

$$PBN=PBsn(S)+PBN(S) \qquad (12)$$

$$PSN=(PBN<<5)|LSN[4:0] \qquad (13)$$

After data in the writing-destination physical block is erased, the data transferred from the access apparatus 200 is written to the page 0 to the page 31 in the erased physical block, in order (S28). The written data may be a FAT.

1.3 Conclusion

As described above, in the present embodiment, the address management section 25 determines the allocation of logical address ranges and segments, in such a way as to equalize the sizes of logical address ranges and to set the size of the segment 0 to which data is rewritten with a higher frequency to be larger than that of the other segments 1 to 15. This allows the segment 0 to include a greater number of physical blocks than those of the other segments 1 to 15, thereby equalizing the frequency of rewriting of data to each block in the segment 0 with the frequency of rewriting of data to each block in the other segments. This can uniform the frequencies of rewriting of data to the respective segments, thereby extending the life of the nonvolatile memory 230. Furthermore, the nonvolatile memory 230 is divided into plural segments, and address management is conducted for each segment, which enables reduction of the size of the address management tables. This results in reduction of the cost of the nonvolatile storage device.

Second Embodiment

A nonvolatile system according to the present embodiment is different from that of the first embodiment, in the configuration of the nonvolatile storage device. The configurations and operations of the other portions are the same as those of the first embodiment. Hereinafter, in the present embodiment, there will be described only the configurations and operations different from the first embodiment.

In the nonvolatile storage device according to the present embodiment, area allocation is determined, such that the logical address range corresponding to a segment having a higher rewriting frequency includes a smaller number of logical blocks, than the numbers of logical blocks included in the other logical address ranges, in order to average the paces at which the respective segments in the physical address ranges reach a guaranteed number of rewritings to extend the life.

2.1 System Configuration

Figure 10:
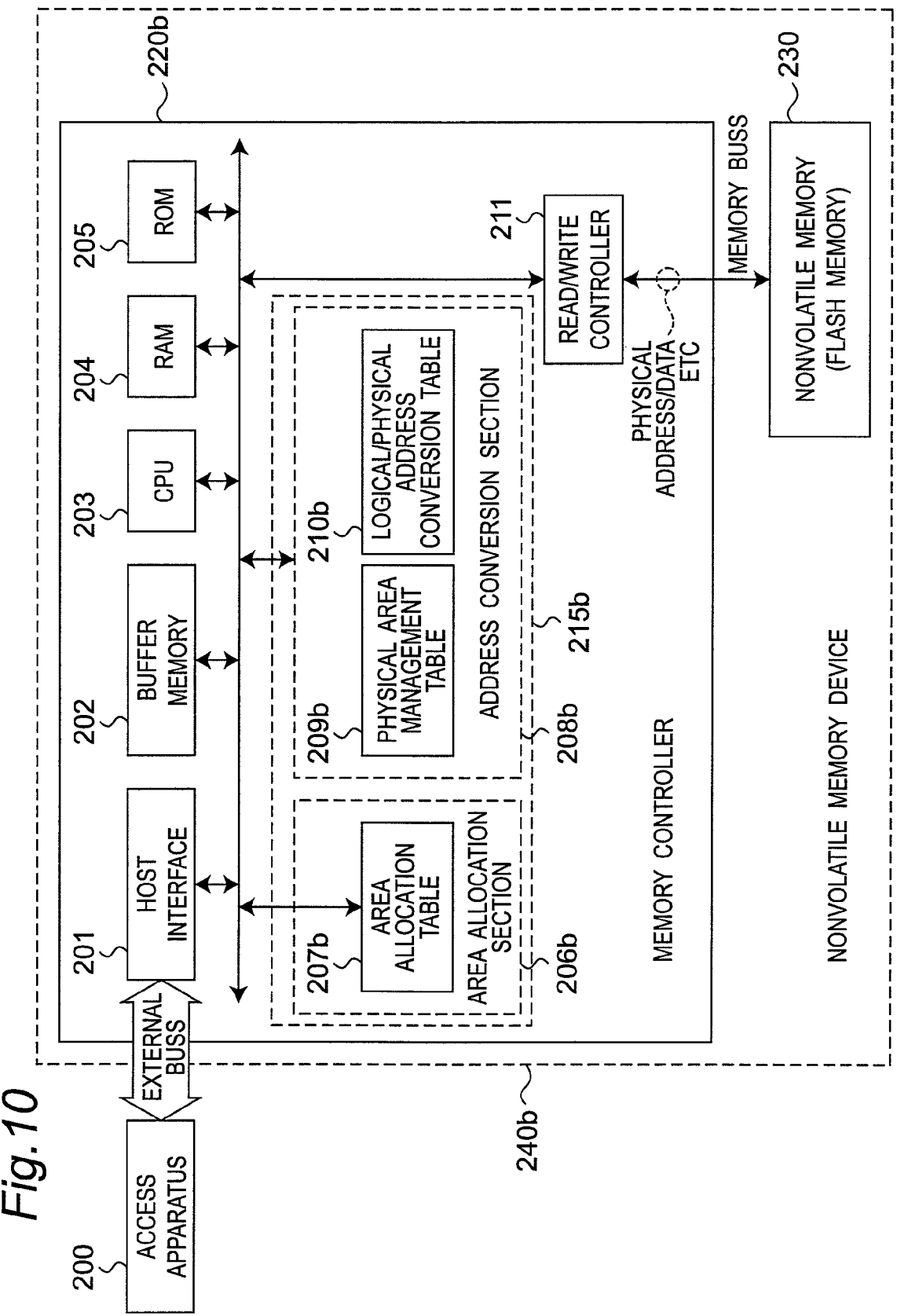
FIG. 10 is a block diagram illustrating the configuration of an entire nonvolatile storage system according to a second embodiment of the present invention.

FIG. 10 is a view illustrating the configuration of a nonvolatile storage system according to the second embodiment of the present invention.

The nonvolatile storage device 240b has a configuration basically similar to that of the nonvolatile storage device 240 according to the first embodiment, but is different from that of the first embodiment in the configurations of the area allocation section 206b and the address conversion section 208b.

Figure 11:
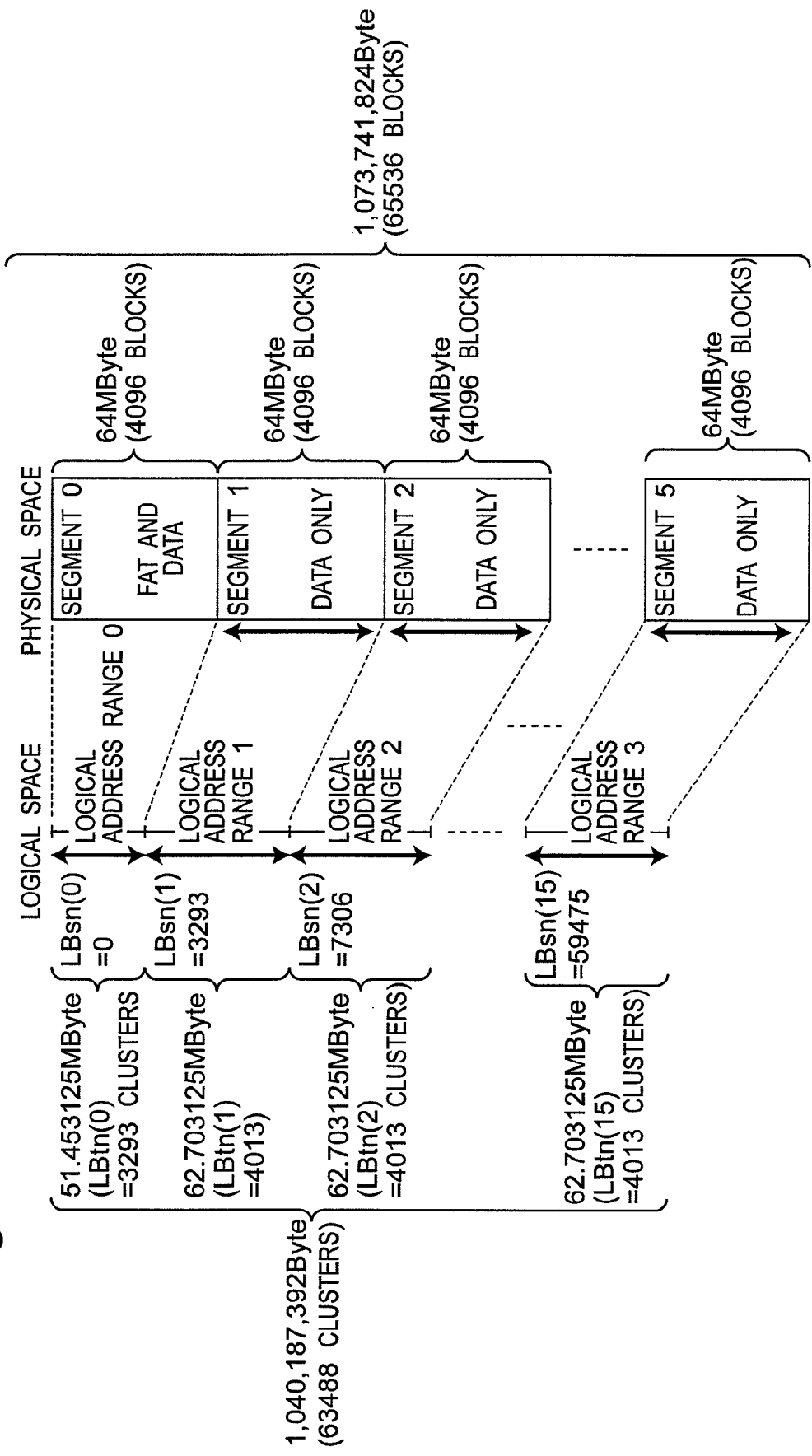
FIG. 11 is a view illustrating a memory map illustrating the correspondence between a logical address space and a physical address space according to the second embodiment of the present invention.

FIG. 11 is a memory map illustrating the correspondence between a logical address space and a physical address space, according to the present embodiment. The logical space is divided into 16 ranges, namely logical address ranges 0 to 15. The physical space is divided into 16 segments, namely segments 0 to 15. There is a one-to-one correspondence between the logical address ranges and the segments. Each segment includes plural physical blocks, each single physical block having a size of 16 Bytes. In the same figure, LBtn(S) indicates the total number of logical blocks in a logical address range S. Further, LBsn(S) indicates the start number of the logical blocks in the logical address range S. S is an integer in the range of 0 to 15.

As illustrated in FIG. 11, in the present embodiment, the logical address range (the logical address range 0) corresponding to a segment having a higher rewriting frequency has a size of 51,453,125 MBytes, and the other logical address ranges (the logical address ranges 1 to 15) have a size of 62,703,125 MBytes. As described above, the area allocation is adjusted, in such a way as to set the size of the logical address range corresponding to the segment having a higher rewriting frequency to be smaller than the size of the other logical address ranges and to equalize the sizes of the respective segments. As described above, a size ratio of the segment to logical address range for the segment having a higher rewriting frequency is made different from size ratios for the other segments, in order to average the paces at which the respective segments reach a guaranteed number of rewritings for extending the life.

Figure 12:
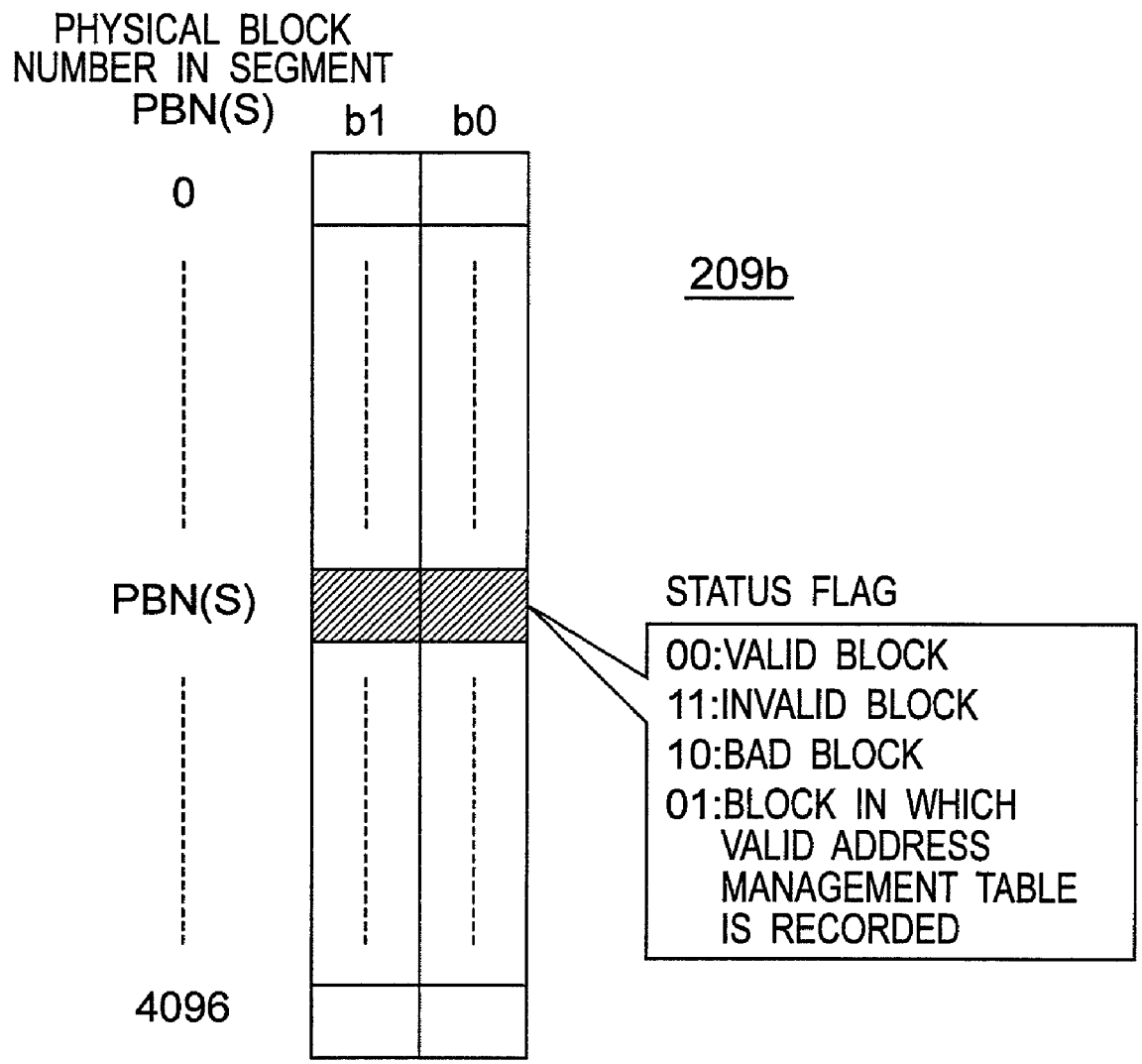
FIG. 12 is a view illustrating a physical area management table in the nonvolatile storage device, according to the second embodiment of the present invention.

FIG. 12 is a view illustrating a physical area management table 209b according to the second embodiment. In FIG. 12, the addresses of the respective entries of the physical area management table 209b correspond to the physical block numbers PEN(S) in a segment in the nonvolatile memory 230. "valid", "invalid", "bad" and the like are stored, as the statuses of the respective physical blocks (block statuses). The values of status flags which indicate the block statuses have the same meanings as those described in the first embodiment.

Figure 13:
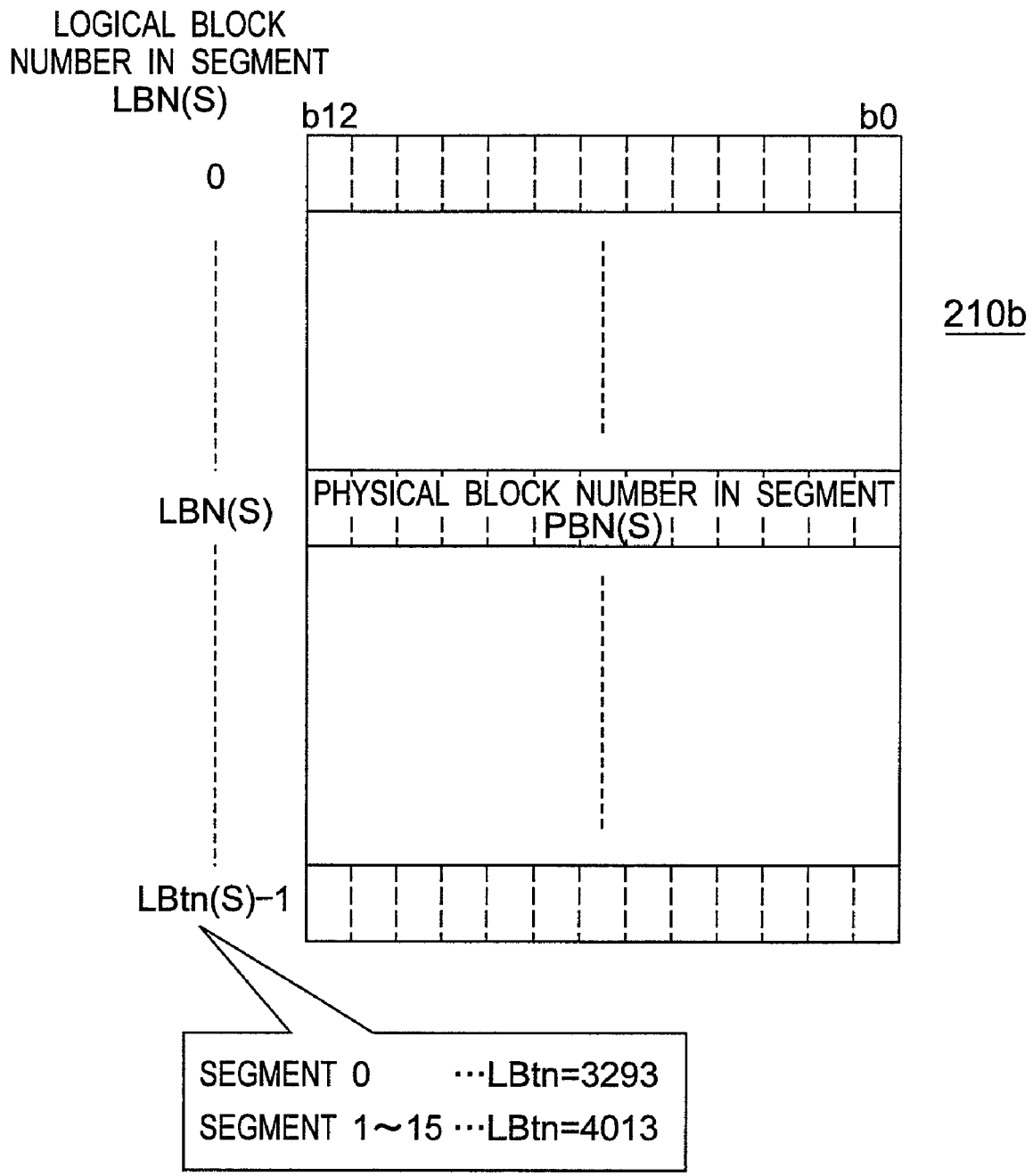
FIG. 13 is a view illustrating a logical/physical address conversion table in the nonvolatile storage device, according to the second embodiment of the present invention.

FIG. 13 is a view illustrating a logical/physical address conversion table 210b according to the second embodiment. In FIG. 13, the addresses of the respective entries of the logical/physical address conversion table 210b correspond to the logical block numbers LBN(S) in the segment. At the positions of the addresses, there are stored the physical block numbers PBN(S) of the physical blocks corresponding to the logical blocks having the logical block numbers LBN(S).

FIG. 14 is the memory map of an area allocation table 207b according to the present embodiment. The addresses of the respective entries of the area allocation table 207b correspond to the segment numbers S and, at these addresses, there are stored the logical-block start numbers LBsn(S) and the logical-block total numbers LBtn(S) of the segments S. The logical-block start numbers LBsn(S) correspond to the start addresses of the logical address ranges corresponding to the segments S, and the logical-block total numbers LBtn(S) indicate the total numbers of the logical blocks included in the logical address ranges corresponding to the segments S.

The correspondence between logical sector numbers LSN (logical sector addresses) and physical sector numbers PSN (physical sector addresses) is the same as that illustrated in FIG. 7 according to the first embodiment.

2.2 Operations

The basic operations of the nonvolatile storage system according to the present embodiment are similar to those of the first embodiment.

2.2.1 Consideration of Rewriting Frequency

Consideration is now conducted on the rewriting frequency in the present embodiment. The same preconditions for writing as those described in the first embodiment will be applied.

In the nonvolatile storage device 240b according to the present embodiment, as illustrated in FIG. 11, the sizes of the respective segments are set to be equal to one another, and the size of the logical address range 0 corresponding to the segment 0 having a higher rewriting frequency is set to be smaller than the size of the other logical address ranges 1 to 15.

The calculation of the logical address ranges is varied depending on the rate of occurrence of bad blocks in the nonvolatile memory 230, the architecture of the memory controller and the like and, in the present embodiment, the respective logical address ranges are determined as follows. The basic concept for the determination is based on setting the size of the logical address ranges 1 to 15 other than the logical address range 0 to be as small as possible, in order to set the size of the logical address range 0 to be smaller.

More specifically, in the present embodiment, at first, the number of logical blocks in each logical address range 1 to 15 is determined, on the basis of an equation (14). In the equation (14), a factor of 0.02 is a factor corresponding to the rate of occurrence of bad blocks in the nonvolatile memory 230 (for example, 2%), and "1" which is the second term in the left-hand side corresponds to a single physical block which stores an address management table.

$$\{(4096) \times (1-0.02)\} - 1 \cdot 4013 \quad (14)$$

Next, the number of logical blocks in the logical address range 0 is determined on the basis of an equation (15).

$$63488 - (4013 \times 15 \text{ segments}) = 3293 \quad (15)$$

In this case, "63488/" is the total number of logical blocks in the nonvolatile memory 230. In the present embodiment, areas which are not directly related to the invention, such as system areas, have not been described, for ease of description. By determining the range of the logical address range 0, it is possible to set the size of the logical address range 0 to be a largest possible size.

Accordingly, the rewriting frequency to the respective physical blocks in the segments 1 to 15 is 0.98, on the basis of the following equation.

$$4013/4096 \cdot 0.98 \text{ time} \quad (16)$$

The rewriting frequency to the physical blocks in the segment 0 is 1.05, on the basis of the following equation.

$$(3293-2+1024)/4096 \cdot 1.05 \text{ time} \quad (17)$$

The results of the aforementioned calculations reveal that, according to the present embodiment, the rewriting frequency for the segment 0 can be significantly reduced in comparison with the prior art and, also, the difference in rewriting frequency between the segment 0 and the other segments 1 to 15 is reduced in comparison with the prior art. Accordingly, in the present embodiment, it is possible to equalize the rewriting frequencies, thereby extending the life of the nonvolatile memory 230.

The logical boundaries of the respective segments are determined from the equations (14) and (15), and information for determining the boundaries is stored in a nonvolatile RAM in the area allocation section 206b, as an area allocation table 207b as illustrated in FIG. 14. The area allocation table 207b can be stored in any of the physical blocks in the nonvolatile memory 230 and, at the time of initialization, it can be read therefrom in the RAM. The RAM can be provided in the area allocation section 206b or can be a partial area of the RAM 204.

2.2.2 Processing by the Address Management Section

Hereinafter, there will be described processing by the address management section 215b (the area allocation section 206b and the address conversion section 208b), in a case where the access apparatus 200 generates a command for rewriting one cluster of data.

If the memory controller 220b receives a write command from the access apparatus 200, then the CPU 203 transfers the control to the address management section 215b. The area allocation section 206b in the address management section 215b determines the segment number S and the logical block number LBN(S) in the segment which correspond to the logical address specified by the access apparatus 200 with reference to the area allocation table 207b. More specifically, the area allocation section 206b conducts processing according to a flow chart illustrated in FIG. 15.

Figure 15:
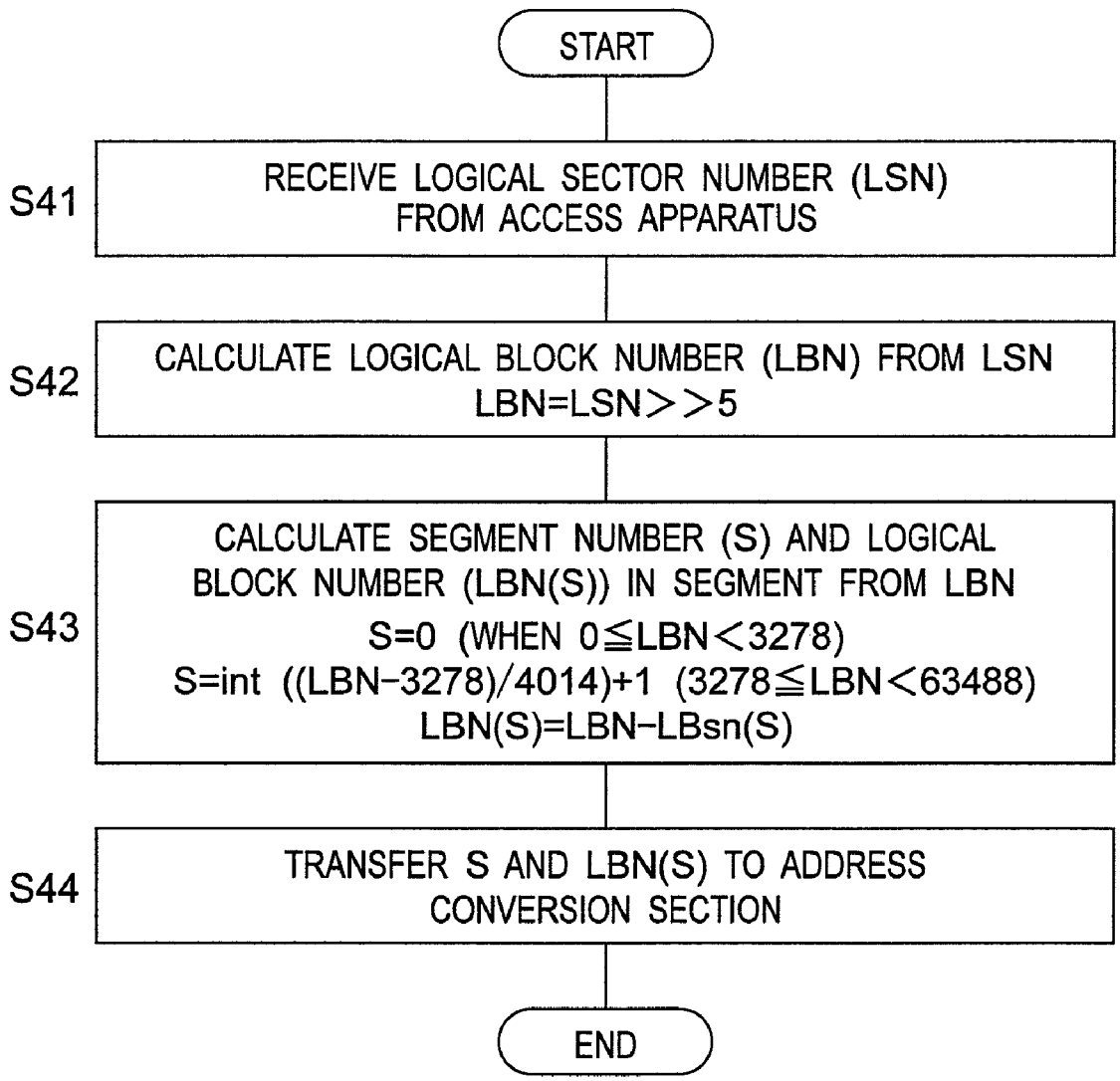
FIG. 15 is a flow chart illustrating processing by an area allocation section in the nonvolatile storage device, according to the second embodiment of the present invention.

In FIG. 15, the area allocation section 206b receives a logical sector number LSN from the access apparatus 200 (S41) and calculates a logical block number LBN according to an equation (18), on the basis of the received logical sector number LSN (S42). With the equation (18), the rightward shift of the logical sector number LSN by 5 bits allows the logical block number LBN to be determined, according to the bit format illustrated in FIG. 7.

$$LBN=LSN>>5 \qquad (18)$$

Next, the segment number S and the logical block number LBN(S) in the segment are calculated from the logical block number LBN (S43). Further, the smallest value of S which satisfies an equation (19) is the segment number, and the logical block number LBN(S) is determined according to an equation (20).

$$LBN-LBsn(S)<LBtn(S) \qquad (19)$$

$$LBN(S)=LBN-LBsn(S) \qquad (20)$$

Finally, the segment number S and the logical block number LBN(S) are transferred to the address conversion section 208 (S44) and, thus, the processing ends.

Figure 16:
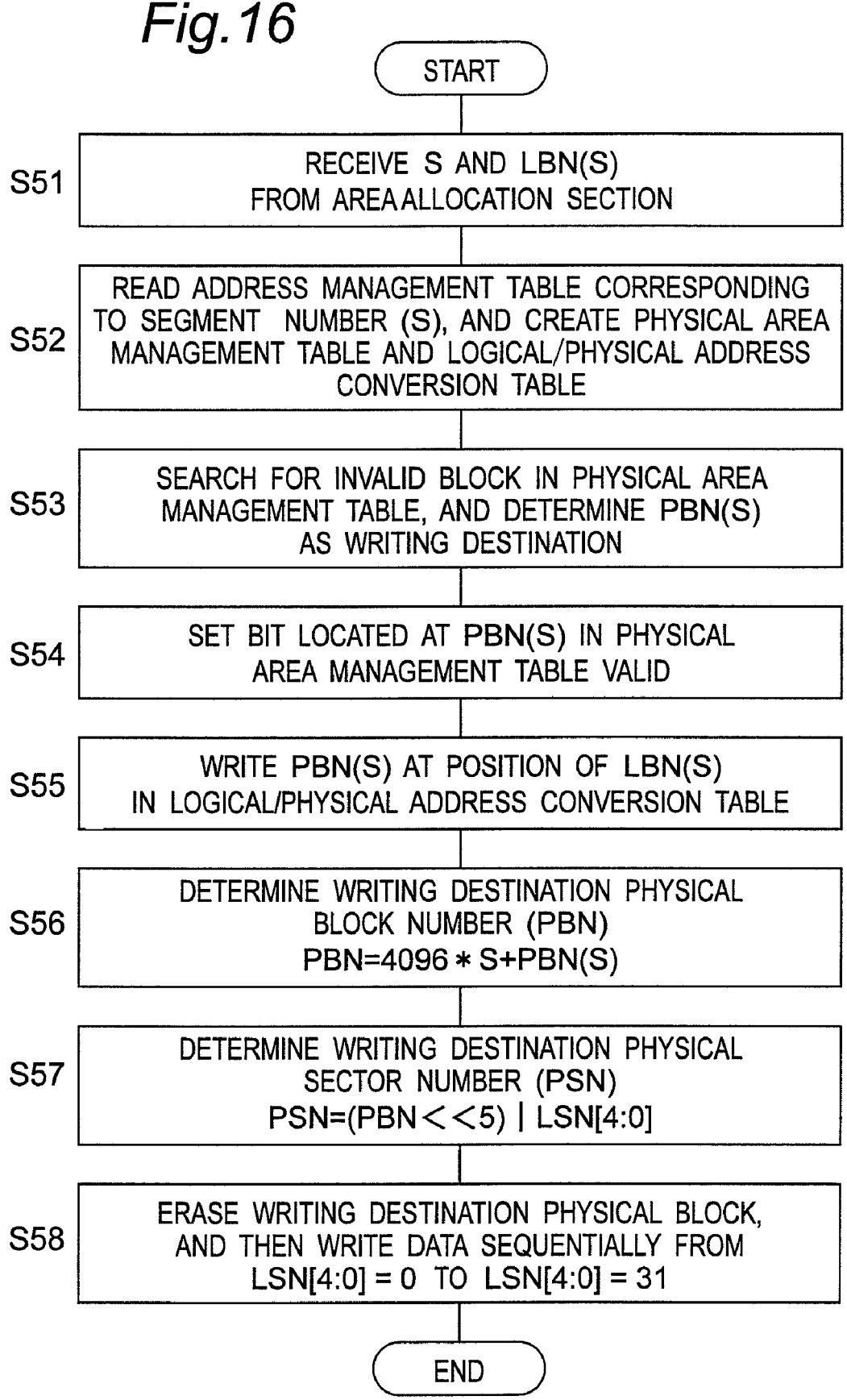
FIG. 16 is a flow chart illustrating processing by an address conversion section in the nonvolatile storage device, according to the second embodiment of the present invention.
Figure 17:
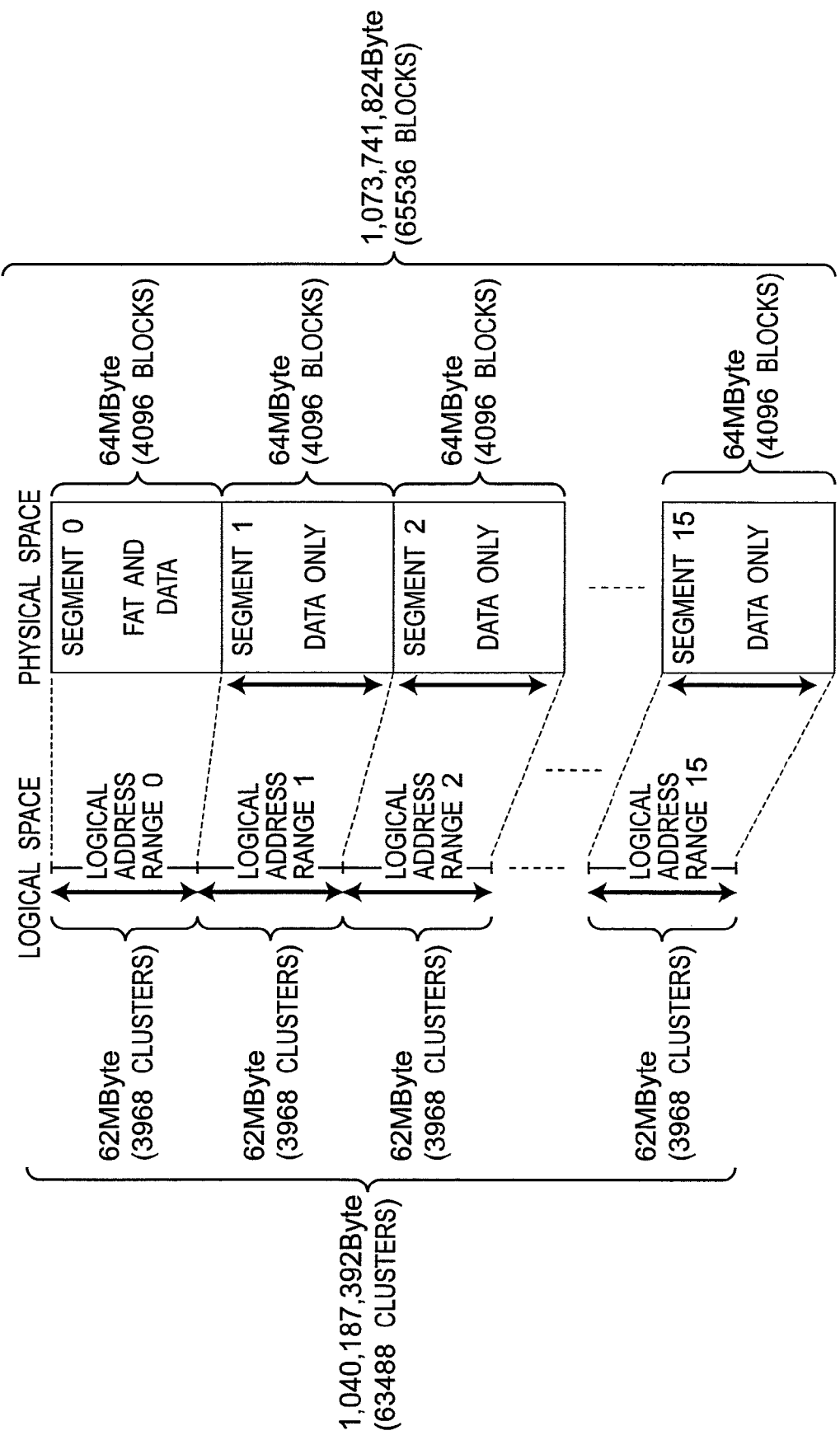
FIG. 17 is a view illustrating a memory map illustrating the correspondence between a logical address space and a physical address space, according to the conventional embodiment.

Thereafter, the address conversion section 208b determines the physical address to which data is to be rewritten, according to a flow chart illustrated in FIG. 16.

In FIG. 16, first, the address conversion section 208b receives, from the area allocation section 206b, the segment number S and the logical block number LBN(S) in the segment (S51). The address conversion section 208b reads an address management table from the area of the nonvolatile memory 230 which corresponds to the segment number S and creates a physical area management table 209b and a logical/physical address conversion table 210b, from the read address management table (S52).

The address conversion section 208b searches for invalid blocks in the physical area management table 209b and determines a PBN(S) as a writing destination (S53). In this case, the searching range is from 0 to 4095. Then, the address conversion section 208b changes the bit at the position of the physical block number PBN(S) in the physical area management table 209b to "valid" (S54) and writes the physical block number "PBN(S)" to the position of the logical block number LBN(S) in the logical/physical address conversion table 210b (S55).

Thereafter, in writing data to the nonvolatile memory 230, the address conversion section 208b determines the writing-destination physical block number PBN on the basis of an equation 21 (S56) and, then, determines the physical address based on sector, namely the physical sector number PSN, on the basis of an equation (22) (S57).

$$PBN=4096\times S+PBN(S) \qquad (21)$$

$$PSN=(PBN<<5)|LSN[4:0] \qquad (22)$$

After data in the writing-destination physical block is erased, the data transferred from the access apparatus 200 is written to the page 0 to the page 31 in the erased physical block, in order (S58). The written data may be a FAT.

2.3 Conclusion

As described above, in the present embodiment, the address management section 215b determines the allocation of logical address ranges and segments, such that the sizes of the logical address ranges are same and the size of the logical address range 0 of which rewriting frequency is higher is set to be smaller than that of the other logical address ranges 1 to 15. This reduces the number of logical addresses of data to be written to the segment 0 corresponding to the logical address range 0, reducing the frequency of rewriting of data to the segment 0, thereby equalizing the frequencies of rewriting of data to the respective segments and extending the life of the nonvolatile memory 230. Furthermore, the nonvolatile memory 230 is divided into plural segments, and address management is conducted for each segment, which can reduce the size of the address management tables.

Namely, according to the first and second embodiments, the allocation of logical address ranges and segments is determined, such that size ratio of the segment to the logical address range for a logical address range having a higher data-rewriting frequency is different from that of the other logical address ranges. This can equalize the rewriting frequencies of data to the respective segments, thereby extending the life of the nonvolatile storage device.

Further, according to the first and second embodiments, the logical space and the physical space are divided, such that either one of the logical space and the physical space is divided into equal fixed sizes, while the other one is divided into variable sizes, for extending the life of the nonvolatile storage device. However, even when both the spaces are divided into variable sizes, it is also possible to determine the area sizes properly to offer the same effects.

Also, if there is further a certain logical address range having a higher rewriting frequency other than the logical address range 0, it is also possible to set the size ratio of the segment to the logical address range of the certain logical address range to be different from the ratios of the other logical address ranges, as well as the logical address range 0.

Furthermore, if the rate of occurrence of bad blocks in a certain segment is higher than that of the other segments and, thus, there is a difference in the number of usable physical blocks therebetween, this may cause the problem that only the certain segment reaches a rewritable life early, similarly to the aforementioned case where there is data to be rewritten with a higher frequency. This can be addressed with the same method as that of the second embodiment. Namely, the size of the logical address range corresponding to the segment having a higher rate of occurrence of bad blocks can be set to be smaller than the size of the other logical address ranges, to adjust the frequencies of rewriting of data to the respective segments. This can average the paces at which the respective segments reach a guaranteed number of times of rewriting, thus resulting in extension of the life of the nonvolatile storage device.

Although the present invention has been described with respect to specific embodiments thereof, various changes and modifications and other usages would be apparent to those skilled in the art. Therefore, the present invention is not limited by the specific disclosures, but by the appended claims. Further, the present application relates to Japanese Patent Application No. 2005-219958 (filed on Jul. 29, 2005) and Japanese Patent Application No. 2005-331060 (filed on Nov. 16, 2005), the contents of which are incorporated by reference herein.

INDUSTRIAL APPLICABILITY

The nonvolatile storage devices according to the present invention can extend the lives of memory cards and the like which employ a nonvolatile memory (flash memory) and the like and can be applied to recording mediums for use with portable AV apparatuses such as personal computers, static-image recording/reproducing apparatuses and moving-picture recording/reproducing apparatuses and portable communication apparatuses such as portable phones.

The invention claimed is:

1. A memory controller which writes and reads data to and from a nonvolatile memory according to a command provided from an external access apparatus and a logical address, the memory controller comprising:

a read/write controller that controls reading and writing of data from and to the nonvolatile memory; and an address manager that divides an entire logical address space into plural logical address ranges, performs address management for individual logical address ranges, divides, physically, a storage area of the nonvolatile memory into plural physical areas, and manages the logical address ranges and the physical areas while associating a logical address range with a physical area;

wherein the address manager includes an area allocator that determines an allocation of the plural logical address ranges and the plural physical areas so that (1) all of the plural logical address ranges are a same size, (2) a ratio of logical address range size for at least one logical address range to a physical area size for a corresponding physical area, which stores management information used for managing files, is different than a ratio of logical address range size to physical area size for other physical areas of the plural physical areas, and (3) the physical area size for the corresponding physical area that stores the management information is larger than a size of other physical areas of the plural physical areas.

2. The memory controller according to claim 1, wherein the allocation of each logical address range and each physical area is fixed.

3. The memory controller according to claim 1, wherein the management information is a file allocation table (FAT).

4. A nonvolatile storage device, comprising:
a nonvolatile memory; and
a memory controller which writes and reads data to and from the nonvolatile memory according to a command provided from an external access apparatus and a logical address, the memory controller comprising:
    a read/write controller that controls reading and writing of data from and to the nonvolatile memory; and
    an address manager that divides an entire logical address space into plural logical address ranges, performs address management for individual logical address ranges, divides, physically, a storage area of the nonvolatile memory into plural physical areas, and manages the logical address ranges and the physical areas while associating a logical address range with a physical area;
    wherein the address manager includes an area allocator that determines an allocation of the plural logical address ranges and the plural physical areas so that (1) all of the plural logical address ranges are a same size, (2) a ratio of logical address range size for at least one logical address range to a physical area size for a corresponding physical area, which stores management information used for managing files, is different than a ratio of logical address range size to physical area size for other physical areas of the plural physical areas, and (3) the physical area size for the corresponding physical area that stores the management information is larger than a size of other physical areas of the plural physical areas.

5. An address management method for a nonvolatile memory including plural physical blocks and being adapted to allow data to be written and read thereto and therefrom according to a command provided from an access apparatus and a logical address, the method comprising:
    dividing an entire logical address space into plural logical address ranges and performing address management for individual logical address ranges;
    dividing, physically, a storage area of the nonvolatile memory into plural physical areas and managing the logical address ranges and the physical areas while associating a logical address range with a physical area; and
    determining an allocation of the plural logical address ranges and the plural physical areas so that (1) all of the plural logical address ranges are a same size, (2) a ratio of logical address range size for at least one logical address range to a physical area size for a corresponding physical area, which stores management information used for managing files, is different than a ratio of logical address range size to physical area size for other physical areas of the plural physical areas, and (3) the physical area size for the corresponding physical area that stores the management information is larger than a size of other physical areas of the plural physical areas.

6. The address management method according to claim 5, wherein the allocation of each logical address range and each physical area is fixed.

7. The address management method according to claim 5, wherein the management information is a file allocation table (FAT).

* * * * *

UNITED STATES PATENT AND TRADEMARK OFFICE
CERTIFICATE OF CORRECTION

| | | |
|---|---|---|
| PATENT NO. | : 8,051,268 B2 | |
| APPLICATION NO. | : 11/814202 | |
| DATED | : November 1, 2011 | |
| INVENTOR(S) | : Masahiro Nakanishi | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 471 days.

Signed and Sealed this
Twentieth Day of March, 2012

David J. Kappos
*Director of the United States Patent and Trademark Office*